(12) United States Patent
Hondl

(10) Patent No.: US 6,728,398 B1
(45) Date of Patent: Apr. 27, 2004

(54) COLOR TABLE INVERSION USING ASSOCIATIVE DATA STRUCTURES

(75) Inventor: Christopher P. Hondl, Minneapolis, MN (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/574,724

(22) Filed: May 18, 2000

(51) Int. Cl.$^7$ .............................. G06K 9/00; G03F 3/08
(52) U.S. Cl. ........................................ 382/162; 358/518
(58) Field of Search ................................ 358/518, 501, 358/504, 519–523; 382/162–167; 345/589–605

(56) References Cited

U.S. PATENT DOCUMENTS

| | | | | |
|---|---|---|---|---|
| 5,068,644 A | * | 11/1991 | Batson et al. ................ | 345/601 |
| 5,517,334 A | * | 5/1996 | Morag et al. ................ | 358/518 |
| 5,764,807 A | * | 6/1998 | Pearlman et al. ............ | 382/240 |
| 5,963,201 A | * | 10/1999 | McGreggor et al. ........ | 345/722 |
| 6,225,974 B1 | * | 5/2001 | Marsden et al. ............ | 345/590 |

* cited by examiner

Primary Examiner—Wenpeng Chen
(74) Attorney, Agent, or Firm—Fish & Richardson P.C.

(57) ABSTRACT

A method and apparatus, including a computer program product, implementing techniques for creating an indexed-color image from a direct-color image. The techniques include receiving a color lookup table and an associative data structure. The color lookup table comprises an indexed list of direct color values. For each pixel of the indexed-color image, the techniques include performing a lookup operation in the associative data structure to determine whether a corresponding direct color value was previously associated with an index value. If the lookup operation yields a positive result, then the associated index value is used as the pixel value. Otherwise, an entry in the color lookup table is selected for the corresponding direct color value of the pixel, the index value of the selected entry is used as the pixel value, and the index value of the selected entry is associated with the corresponding direct color value in the associative data structure.

16 Claims, 1 Drawing Sheet

COLOR TABLE INVERSION USING ASSOCIATIVE DATA STRUCTURES

BACKGROUND OF THE INVENTION

The present invention relates to creating indexed-color images.

Current image processing systems provide numerous methods for converting an image into an indexed-color image. One system provides a color lookup table for the image and uses a tree algorithm or a brute force algorithm to invert the color lookup table to create the indexed-color image. Another system provides a color lookup table for the image and uses a 32768 entry table indexed with 3 5-bit numbers to invert the lookup table. The system first fills the 32768 entry table with the closest index in the color lookup table corresponding to the direct color represented by each 3 channel, 5-bit per channel number that indexes the 32768 entry table. For a direct color value of the image, the most significant 5 bits of each channel in the direct color value (e.g., the red channel in an RGB color value) are used as an index into the 32768 entry table. The color lookup table index that is stored in the 32768 entry table at that location is used to represent the color in the indexed image.

In general, the number of entries in a color lookup table ranges from 2 to 256. However, this number is limited only by the number of bits used to define each color in the indexed-color image. If the image has 256 or fewer distinct colors, the color lookup table defines an exact palette consisting of the exact colors used in the image. Alternatively, the color lookup table defines an adaptive palette formed by taking a sample of all the colors in the image (i.e., the most commonly-used colors in the image or the colors providing the best coverage of the image). An adaptive palette can be used by a dithering process to approximate colors that do not specifically appear in the image. If the image is going to be reproduced on a web-site, for example, the color lookup table can be a web palette that consists of the 216 web-safe colors shared by most computers.

Conventionally, to convert each pixel's color value to an index value, a system searches the color lookup table to find the entry having the color value closest to the color value of the pixel, and places the index of the entry into the indexed-color image. This process is time-consuming and computationally inefficient.

SUMMARY OF THE INVENTION

In general, in one aspect, the invention provides a method and apparatus, including a computer program product, implementing techniques for creating an indexed-color image from a direct-color image. The techniques include receiving a color lookup table comprising an indexed list of direct color values; receiving an associative data structure, the associative data structure being different from the lookup table and associating direct color values in the direct-color image with indices into the color lookup table; and for each pixel of the indexed-color image, performing a lookup operation in the associative data structure to determine whether a corresponding direct color value was previously associated with an index value. If the corresponding direct color value was previously associated with an index value, then the associated index value is used as the pixel value. Otherwise, an entry in the color lookup table is selected for the corresponding direct color value of the pixel, the index value of the selected entry is used as the pixel value, and the index value of the selected entry is associated with the corresponding direct color value in the associative data structure.

Advantages that can be seen in implementations of the invention include one or more of the following. The invention uses an associative data structure, such as a hash table, to provide good speed performance in converting direct color values to index values. The use of associative data structures provides for more accurate results compared to the approximations resulting from the use of the 555 lookup table algorithm or the tree algorithm.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
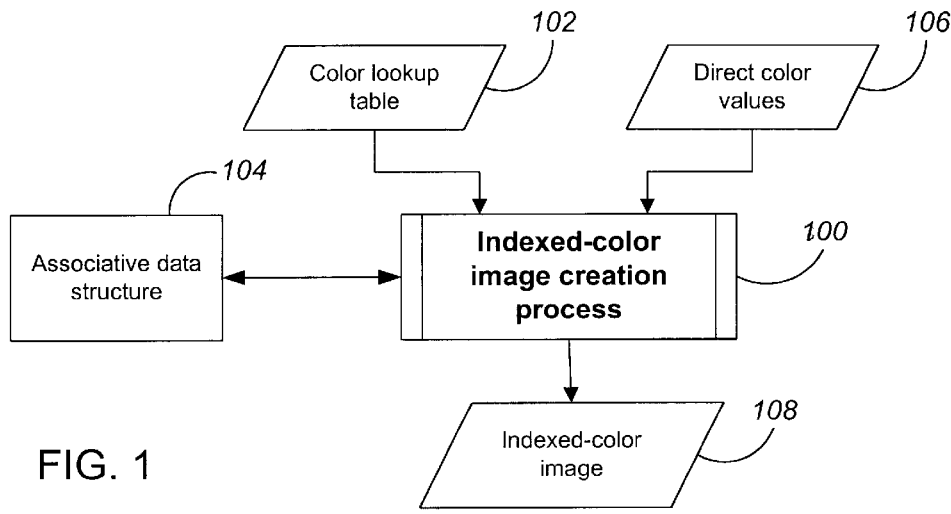
FIG. 1 shows a indexed-color image creation process in accordance with the present invention.

FIG. 1 shows a process 100 implemented in a computer program application for creating an indexed-color image 108. The inputs to the process 100 are a color lookup table 102 and direct color values 106.

The color lookup table 102 can define any kind of palette, such as an exact palette, an adaptive palette, or a web palette. The pixel value for a pixel in an indexed-color image 108 is an integer that does not specify the color of the pixel directly; rather, it is an index into the color lookup table 102, each entry of which represents a color or gray-scale value ("direct color value") in a particular color space, such as an RGB color space, a CMYK color space, or a L*a*b* color space.

Collectively, the direct color values 106 may define an image. Each direct color value 106 may be the original color value of a pixel in the image or a modified color value resulting from the application of a dithering (e.g., error-diffusion) process to the image.

Figure 2:
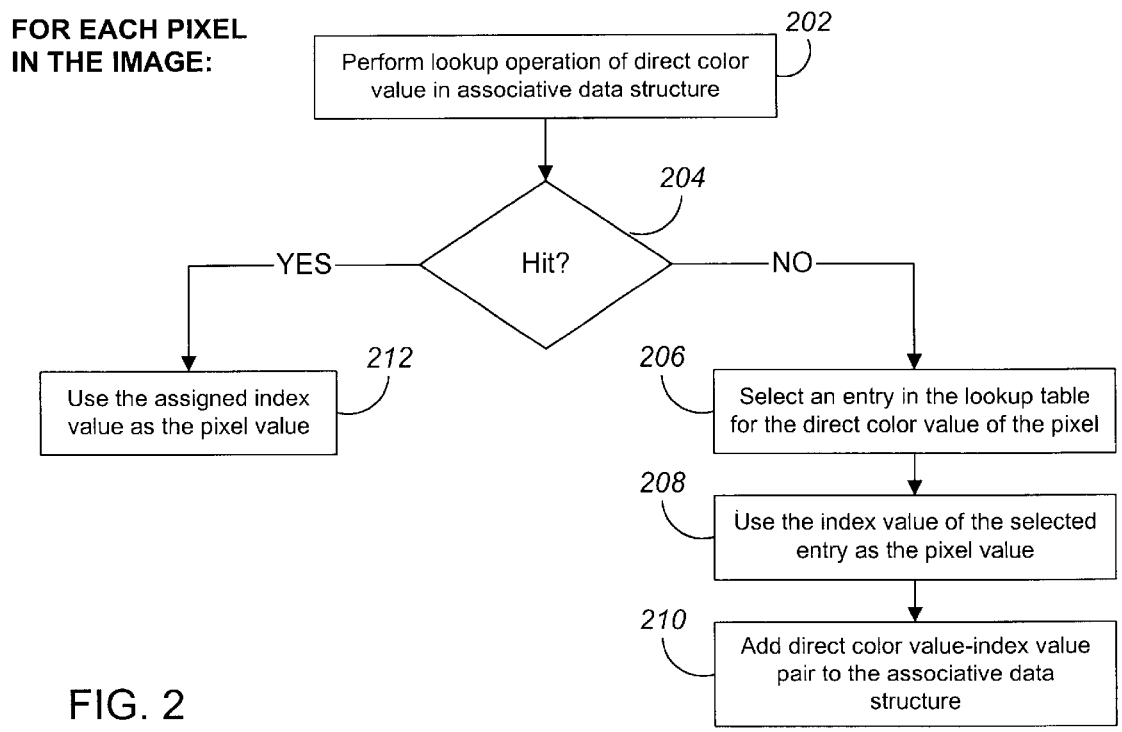
FIG. 2 is a flow chart of a process in accordance with the present invention.

To create an indexed-color image 108, the application converts the direct color values 106 to index values. As shown in FIG. 2, for each pixel of the indexed-color image, the application first performs a lookup operation of an associative data structure 104 (step 202) to determine whether the corresponding direct color value 106 was previously assigned to an index value (step 204). The term "corresponding direct color value" refers to the original or modified direct color value 106 corresponding to a pixel at a particular position in the indexed-color image. If the lookup operation of the associative data structure 104 yields a negative result (i.e., the corresponding direct color value was not previously assigned to an index value), the application then selects an entry in the color lookup table 102 for the corresponding direct color value of the pixel (step 206). In one implementation, the entry is selected by searching the color lookup table 102 to find an entry having a direct color value closest to the corresponding direct color value of the pixel. Any distance metric, such as the standard Euclidean metric and a weighted Euclidean metric, can be used to measure the distance between the corresponding direct color value of the pixel and each of the direct color values stored in the color lookup table 102. The index value of the entry having a direct color value closest to the corresponding direct color value of the pixel is used as the pixel value for the pixel being processed (step 208). The application then assigns or associates the index value to the direct color value and adds the direct color value-index value pair to the associative data structure 104 (step 210). A subsequent lookup operation of an instance of the direct color value would return the assigned or associated index value without a search of the color lookup table 102 being performed. If, on the other hand, the lookup operation in the associative data structure 104 yields a positive result (i.e., the corresponding direct color value was previously assigned to an index value), the application retrieves the index value and uses the retrieved value as the pixel value for the pixel being processed (step 212). Once all of the pixels 106 are processed, the indexed-color image 108 has been produced, and the process 100 is terminated.

The associative data structure 104 is built incrementally as the corresponding direct color values 106 are processed and converted to index values. It should be noted that the associative data structure 104 provided by the application may initially be empty or pre-populated with the direct color value-index value pairs in the color lookup table 102.

In one implementation, the associative data structure 104 is a hash table. For speed of operation, a multiplicative hash table is advantageous. To add a new direct color value-index value pair to the hash table, the application applies a hash function to the corresponding direct color value of the pixel to compute a hash address in the hash table. The application then stores the index value at the hash address location. If, when adding a new direct color value-index value pair, the hash table already has an entry at the indicated hash address location, then, in one implementation, that entry's direct color value is compared with the given direct color value to see if it is the same. If two index values' direct color values hash to the same hash address (a "hash collision"), then some alternative location (e.g., the next free location cyclically following the indicated one) in the hash table is used. The application can be configured to empty the hash table once the number of occupied hash addresses reaches or exceeds a predetermined level of occupancy. Once emptied, the hash table is re-built as more corresponding direct color values 106 are processed and converted to index values.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results.

What is claimed is:

1. A method for creating an indexed-color image from a direct-color image, comprising:

receiving a color lookup table, the color lookup table comprising an indexed list of direct color values;

receiving an associative data structure, the associative data structure being different from the lookup table and associating direct color values in the direct-color image with indices into the color lookup table; and for each pixel of the indexed-color image, performing a lookup operation in the associative data structure to determine whether a corresponding direct color value was previously associated with an index value, and if so, using the associated index value as the pixel value, and otherwise, selecting an entry in the color lookup table for the corresponding direct color value of the pixel, using the index value of the entry as the pixel value, and associating the index value of the entry with the corresponding direct color value in the associative data structure.

2. The method of claim 1, wherein the associative data structure is a hash table.

3. The method of claim 2, wherein the hash table is a multiplicative hash table.

4. The method of claim 1, wherein the entry in the color lookup table is selected by searching the lookup table to find an entry having a direct color value that is closest to the corresponding direct color value of the pixel.

5. The method of claim 4, wherein the direct color value in the color table that is closest to the corresponding direct color value of the pixel is measured using a standard Euclidean distance metric.

6. The method of claim 4, wherein the direct color value in the color table that is closest to the corresponding direct color value of the pixel is measured using a weighted Euclidean distance metric.

7. The method of claim 4, wherein the direct color value in the color table that is closest to the corresponding direct color value of the pixel provides an exact match.

8. The method of claim 1, wherein:

the associative data structure is a multiplicative hash table; and the entry in the color lookup table is selected by finding an entry in the color lookup table having a direct color value closest to the corresponding direct color value of the pixel, wherein the difference between the direct color value of each entry in the color lookup table and the corresponding direct color value of the pixel is measured using a distance metric.

9. A computer program product stored on a machine-readable medium for creating an indexed-color image from a direct-color image, the product comprising instructions operable to cause a programmable processor to:

receive a color lookup table, the color lookup table comprising an indexed list of direct color values;

receive an associative data structure, the associative data structure being different from the lookup table and associating direct color values in the direct-color image with indices into the color lookup table; and for each pixel of the indexed-color image, perform a lookup operation in the associative data structure to determine whether a corresponding direct color value was previously associated with an index value, and if so, use the associated index value as the pixel value, and otherwise, select an entry in the color lookup table for the corresponding direct color value of the pixel, use the index value of the entry as the pixel value, and associate the index value of the entry with the corresponding direct color value in the associative data structure.

10. The product of claim 9, wherein the associative data structure is a hash table.

11. The product of claim 10, wherein the hash table is a multiplicative hash table.

12. The product of claim 9, wherein the entry in the color lookup table is selected by searching the lookup table to find an entry having a direct color value that is closest to the corresponding direct color value of the pixel.

13. The product of claim 12, wherein the direct color value in the color table that is closest to the corresponding direct color value of the pixel is measured using a standard Euclidean distance metric.

14. The product of claim 12, wherein the direct color value in the color table that is closest to the corresponding direct color value of the pixel is measured using a weighted Euclidean distance metric.

15. The product of claim 12, wherein the direct color value in the color table that is closest to the corresponding direct color value of the pixel provides an exact match.

16. The product of claim 9, wherein:

the associative data structure is a multiplicative hash table; and the entry in the color lookup table is selected by finding an entry in the color lookup table having a direct color value closest to the corresponding direct color value of the pixel, wherein the difference between the direct color value of each entry in the color lookup table and the corresponding direct color value of the pixel is measured using a distance metric.

* * * * *